UNITED STATES PATENT OFFICE.

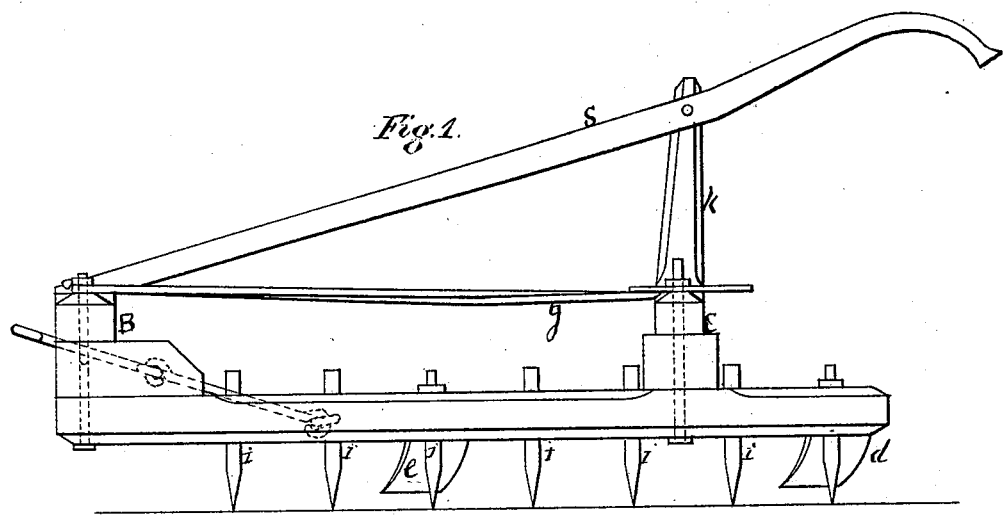
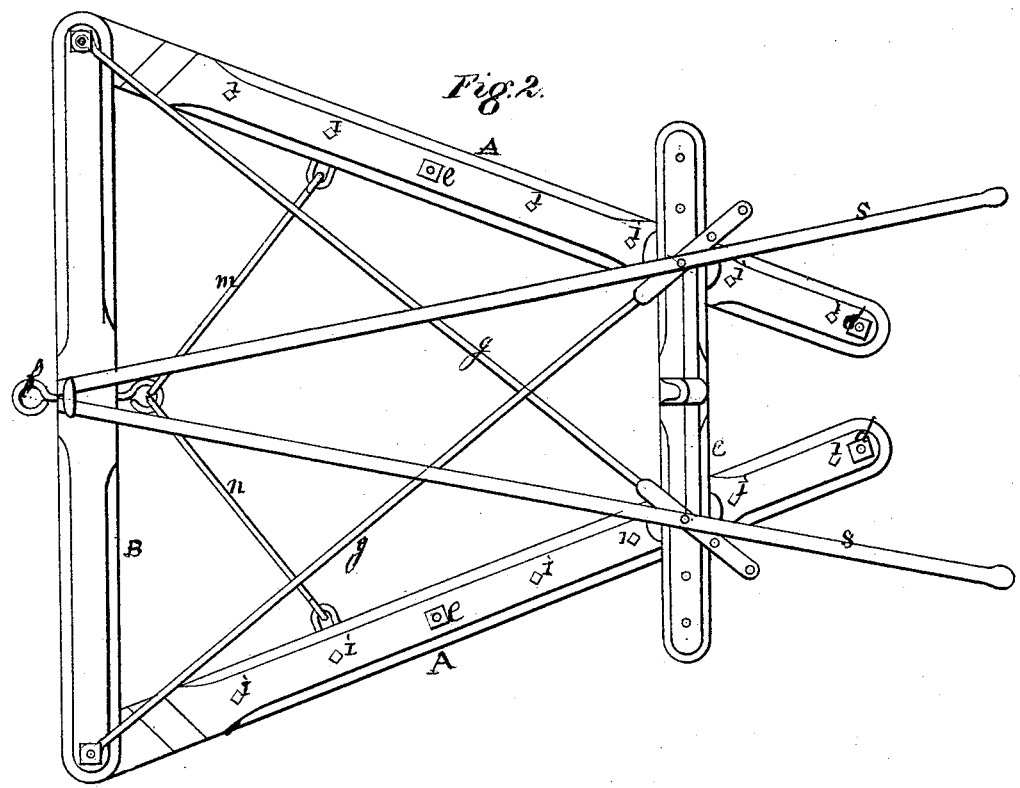

REUBEN WOTTRING, OF PROSPECT, OHIO.

IMPROVEMENT IN CULTIVATORS.

Specification forming part of Letters Patent No. 101,695, dated April 5, 1870.

*To all whom it may concern:*

Be it known that I, REUBEN WOTTRING, of Prospect, in the county of Marion and State of Ohio, have invented certain new and useful Improvements in Cultivators; and I do hereby declare that the following is a full, clear, and exact description thereof, reference being had to the accompanying drawings, and to the letters of reference marked thereon, which form a part of this specification, in which—

Figure 1 is a side elevation of my cultivator. Fig. 2 is a plan view of the same.

The nature of my invention consists in constructing a cultivator by the use of certain devices hereinafter set forth.

A and A represent the side pieces of my cultivator, and B and C the cross-bars which bind the side pieces together. The side pieces, A and A, incline inwardly from their point of attachment to cross-bar B, and are separated at their rear end sufficiently far to enable the two shovels $d$ and $e$ to plow two rows at the same time. The cross-bars B and C are both elevated to a suitable distance above the side pieces, A and A, by means of blocks, through which iron bolts pass to bind them firmly to side pieces, A and A. Two metal rods, $g$ $g$, are secured to the outer ends of bar B by means of the same bolts that secure the said bar to the side pieces. The rods $g$ $g$ intersect each other, and are secured to bar C with the same screw-bolts that pass through said bar and through side pieces, A A. The ends of rods $g$ $g$ are flattened at their point of rest on bar C and have several perforations, which correspond to the same number of holes through bar C. By this arrangement the rear end of side pieces, A A, can be adapted to the distance of the corn-rows apart. Two metal rods, $m$ and $n$, are confined by staples entering the inner surface of side pieces, A A. The opposite ends of said rods are hooked into a link, $f$, which is secured to the under side of cross-bar B at its center. To the outer end of $f$ the horses will be attached in the usual manner.

S S designate the handles, the front ends of which are fastened to the upper surface of bar B. Near their rear ends the said handles are supported by means of a rod which passes through an upright, $k$, the said upright being mortised into the cross-bar C.

My cultivator is furnished with two shovels on each side piece, one shovel, $d$, near the rear end, and another, $e$, near the middle of each side piece. A greater number can be used, if required. In addition to the shovels each side piece is furnished with harrow-teeth $i$, placed at the usual distance apart.

Having thus described my invention, what I claim, and desire to secure by Letters Patent, is—

1. The side pieces, A A, in combination with cross-bars B and C and intersecting rods $g$ $g$, when constructed and arranged as and for the purpose set forth.

2. The side pieces, A A, cross-bars B and C, rods $g$ $g$, hinged rods $m$ $n$, link $f$, teeth $i$ $i$, and shovels $e$ $e$, all combined and arranged as and for the purpose described.

In testimony that I claim the foregoing as my own, I affix my signature in presence of two witnesses.

REUBEN WOTTRING.

Witnesses:
SYLVESTER LATIMER,
FREDK. M. JOY.